United States Patent [19]
Hocking

[11] 3,739,334

[45] June 12, 1973

[54] PILOT LAMP ELECTRONIC MULTI-SWITCHING CIRCUITRY

[76] Inventor: Loren P. Hocking, 16495 East Eight Mile Road, East Detroit, Mich. 48021

[22] Filed: Aug. 4, 1971

[21] Appl. No.: 168,955

[52] U.S. Cl. .............. 340/334, 307/38, 307/252 B, 315/312, 340/332

[51] Int. Cl. .............. G09f 9/32

[58] Field of Search ............ 340/332 X, 332, 33 A, 340/251, 21 A, 225; 307/252 B, 38, 140; 317/137; 315/312

[56] References Cited

UNITED STATES PATENTS 3,421,063 1/1969 Reinke .............. 307/38

*Primary Examiner*—John W. Caldwell
*Assistant Examiner*—Glen R. Swann, III
*Attorney*—Benjamin W. Colman

[57] ABSTRACT

An electronic switching circuit, device and system for selective signalling or simultaneous testing of a plurality of pilot lights or lamps. In a plural system of signal or display lamps or pilot lights, connected in a common and/or individual circuits for signalling current flow or creating a display on an individual or multiple basis, the electronic switching device and circuitry performs dual functions of testing and signalling the lamp or pilot light, without modification of conventional electrical circuitry. The components of the electronic switching circuitry can be embodied into a unitary device.

18 Claims, 4 Drawing Figures

INVENTOR.
LOREN P. HOCKING
BY Benjamin A. Coleman
ATTORNEY

Patented June 12, 1973

3,739,334

2 Sheets-Sheet 2

BY [signature]

ATTORNEY

PILOT LAMP ELECTRONIC MULTI-SWITCHING CIRCUITRY

BACKGROUND OF THE INVENTION

The electronic switching circuitry, device and system of this invention is designed for use with conventional panel board pilot light devices and units, and electric lamp displays or signs, arranged in plural electrical circuits. One or a plurality of such pilot lights or lamps can be connected for simultaneous or selected energizing. The inventive switching circuitry provides testing the pilot light or lamp in each circuit simultaneously with every other pilot light or lamp and every other circuit, and for selective signalling of each pilot light or lamp to indicate the functional operativeness of the circuit in which the pilot light or lamp is connected.

It will of course be understood by persons skilled in the art to which the invention pertains that very often pilot lights, designed to signal the flow of current in a circuit, are burned out or fail to function for some other reason while current flow is present in that circuit. The failure of the pilot light to light and serve as a visual indication of current flow can result in malfunctions of devices served by the circuitry, production problems where a number of machine units or operating devices are involved, and many other difficulties and unfavorable results. Although there are systems for testing pilot lights on an individual basis and in some instances on a plural basis, a simple circuitry and device connected to each circuit embodying a pilot light is not known.

Similarly, where large display signs having hundreds or even thousands of electric lamps are connected in an organization and operated by switching mechanism for selective on-off energization of individual lamps, the capability of simultaneously energizing all of the lamps in order to determine which of them has burned out or will not light up has been a problem in the sign industry for some time. Attempts to provide circuitry for these display signs and systems have involved the use of very expensive and structurally burdensome arrangements and circuitry.

The switching circuitry, device and system of the instant invention will materially reduce the cost and simplify the means for achieving the testing and signalling functions of the display lamp in these types of signs and systems.

SUMMARY OF THE INVENTION

The basic circuitry for the switching device includes the organization of a solid state plural layer diode switching device known as a triac, a pair of diodes in parallel with each other, a pair of resistors in series connected at one end to the junction of the parallel diodes and at the other end to the triac, and a capacitor connected to the junction of the resistors. The triac is connected on one side to the "hot" line and on the other side to a load line. One of the diodes is connected in a "signalling" circuit, and the other diode in a "test" circuit for simultaneously testing all pilot lights or lamps. The components of the switching circuitry have values to accommodate the voltage rating of the "hot" line to which the circuitry is connected. Each such switching circuitry, whether arranged as a part of the pilot light or display lamp housing, or mounted as a unitary device in connection with such housing, or connected to or as part of a push button or other type switching device, becomes a component of the circuit in which each pilot light or lamp is a part. The electronic switching circuitry is connected as a unit to one or more signalling pilot lights, display lamps or other signalling elements.

Various further and more specific objects, features and advantages of the invention will appear from the description given below, taken in connection with the accompanying drawings, illustrating by way of example preferred forms of the invention. Reference is here made to the drawing annexed hereto and forming an integral part of this specification, in which

DRAWINGS

DESCRIPTION OF PREFERRED EMBODIMENTS

Figure 1:
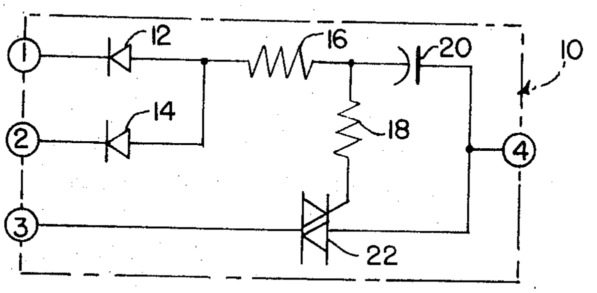
FIG. 1 is a wiring diagram of representative switching circuitry embodying the invention.

As shown particularly in FIG. 1, the inventive switching circuitry 10 comprises the diodes 12 and 14 arranged in parallel and connected to a first resistor 16 in series with a second resistor 18 and a triac unit 22, one side of capacitor 20 being connected at the junction of the two resistors. The "test" diode 12 has a terminal 1, the "signal" diode 14, the terminal 2, the triac 22 having the terminals 3 and 4. The triac unit, being an alternating current solid state device, has its terminal 3 connected through a load to the "hot" line of the alternating current source, terminal 4 being connected to the other or "common" line of the alternating current source. The second side of the capacitor 20 is also connected to terminal 4.

To unitize the switching circuitry 10 and make it more convenient for use as a structural component of a circuit in which the circuitry 10 is usable, the components of the circuitry 10 including their terminals can be embodied into a unit 23 (FIG. 3) comprising a body 24 of insulating potting material on one face of which the terminals 1, 2, 3 and 4 are arranged with screws 26, 28, 30 and 32 respectively, to secure the ends of external electrical conductors to these terminals.

The unitary device 23 can be used as an independent supplement to a push-button switch, a pilot light, or a signal lamp or display lamp housing, or can be completely embodied within such housings. The manner in which the switching circuitry 10 can be utilized, in any of these forms, with a plurality of pilot lights or lamps, is illustrated in FIG. 2, which is one representative example of an application for such switching circuitry.

The switching circuitry 10 functions in the following manner. When a "test" or "signal" voltage is received through the diodes 12 or 14 respectively and through the resistors 16 and 18 to the gate of the triac gate circuit or unit 22, the triac unit becomes conductive and conducts current from terminal 3 to terminal 4, energizing any signalling element, such as a pilot light or lamp, that is connected to terminal 3 and to the "hot" line of the AC voltage. The diodes 12 and 14 being rectifiers and having a peak inverse voltage characteristic, pass current only in one direction, to the triac 22, thus preventing feedback to other signal circuits. As long as a signal voltage is maintained from either of the diodes 12 or 14, the triac 22 remains closed and conducts voltage and current from terminal 3 to terminal 4. As soon as such signal voltage drops or terminates, the triac opens, switching off current flow from terminal 3 to terminal 4. Thus, the triac unit 22 forms a part of two circuits, a gate circuit operating through either of the "hot side " terminals 1 or 2 and the diodes 12 or 14 connected respectively thereto, the resistors 16 and 18 and con-nected capacitor 20, the triac unit 22 and the "common side" terminal 4, and the load circuit operating through a load connected on one side to the power hot line and on its other side directly to the terminal 3 or through a switching unit in turn connected to the terminal 3, the triac unit 22 and the "common side" terminal 4.

The value ratings of the diodes, resistors, capacitor and triac are related directly to the voltage of the AC source. For a 120 v. line, the diodes 12 and 14 which have proven satisfactory in a prototype circuit have a rating of 1 ampere, 400-volt peak inverted voltage (PIV), resistor 16 is rated at 22K ½–10 percent, resistor 18 at 6.8K ½–10 percent, capacitor at 10 uf-20VOC, and the triac at 120 v. (RCA–40526). Of course, as voltage and current specifications change, the rated values of the components forming the inventive switching circuitry 10 must be selected in accordance with such specifications.

Figure 2:
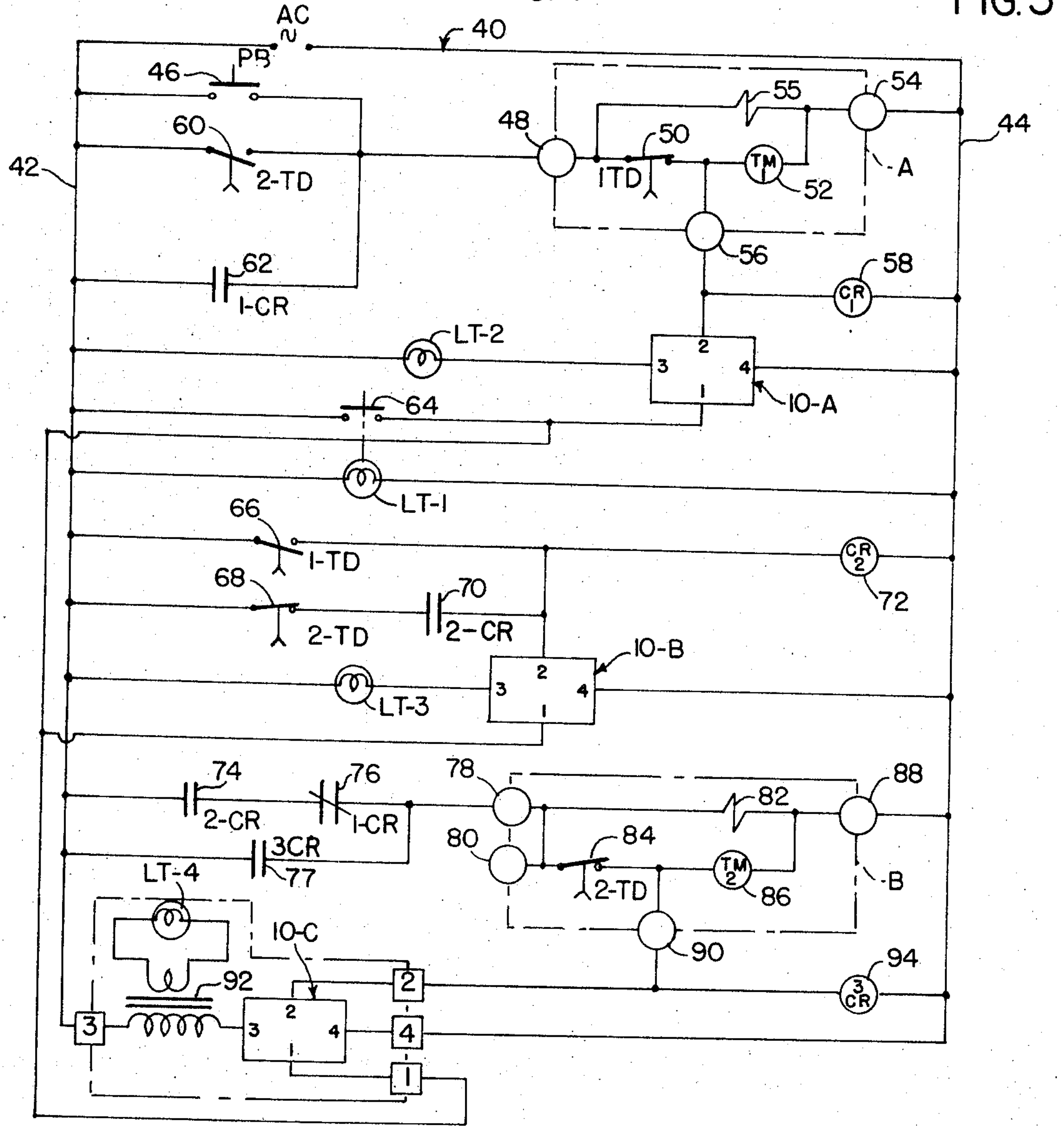
FIG. 2 is a wiring diagram illustrating the switching circuitry embodied in a representative pilot light circuit.

A representative example of an application for the switching circuitry 10 is illustrated in the FIG. 2 wiring diagram and comprises the alternating current circuit 40 having a "hot" line 42 and a common line 44, to which test and signalling components including the pilot or signal lamps LT–1, LT–2, LT–3 and LT–4 are connected.

Figure 3:
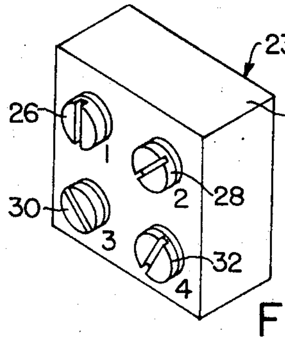
FIG. 3 is a perspective view of a unitary switching device embodying the circuitry diagrammatically illustrated in FIG. 1, substantially actual size.

The switching units 10A, 10B and 10C, each of which contains the circuitry 10, are represented by the block areas containing the terminal reference numerals 1, 2, 3 and 4 as illustrated in FIGS. 1 and 3. In the lowermost left portion of the diagram in FIG. 2, the individual blocks numbered 1, 2, 3 and 4 represent wire connection points for corresponding terminals of the switching circuitry in the unit 10C.

In the alternating current circuit 40, the control "start" push button switch 46 is connected to the hot line 42 and to the common line 44 through a time delay circuit A comprising the wire connection 48, the first time delay normally closed contact 50, the first time delay drive motor 52, and the wire connection or terminal 54. The time delay contact 50 and the timer motor 52, in series, are connected in parallel with the drive clutch 55 to wire terminals 48 and 54. Another connection is made through the terminal 56 and the first control relay coil 58 to the common line 44.

Connected to the hot line 42 and in parallel with the push button switch 46 are the second time delay normally open contact 60 and the first control relay contact 62.

The "test" push button switch 64 connected to terminal 1 of the switching unit 10A is also connected to terminals 1 of the switching units 10B and 10C, to test the presence of voltage energizing the signal lamps LT–2, LT–3 and LT–4. The first time delay normally open contact 66 is connected in parallel with the second time delay normally closed contact 68 and the second control relay sealing or holding contact 70. The second control relay coil 72 is connected to the conjunction of the normally open contact 66 and contact 70.

The second control relay contact 74 is connected in series with the first control relay normally closed contact 76, and these two units are connected in parallel with the third control relay normally open contact 77, and to wire connection terminals 78 and 80 of the second time delay circuit B, in turn connected to the second time delay clutch 82 in parallel with the second time delay normally closed contact 84 and the second timer motor 86. The second time delay clutch and timer motor are connected to the common line 44 through the wire connection 88. The second time delay normally closed contact 84 and the second timer motor 86 are connected through the connector 90 to terminal 2 of switching unit 10C.

The signalling lamp LT–4 is connected to the secondary winding of the transformer 92, its primary winding being connected by terminal 3 to the hot line 42 and the switching unit 10C. Terminal 2 of that switching unit is connected to the third control relay coil 94 connected to the common line 44.

When the "start" push button switch 46 is closed, passing voltage to the first time delay normally closed contact 50, the first control relay coil 58 is energized and closes the first control relay contact 62. The first control relay coil 58 and the first time delay contact 50 are energized and held closed after the push button switch 46 has been released. The normally closed contact 50 opens after the first time delay normally open contact 66 closes. Contact 66 is the first time delay contact and contact 50 the second time delay contact of the first time delay motor 52.

The test push button switch 64 is closed to determine the presence of voltage at the pilot or signal lampts LT–2, LT–3 and LT–4, which are normally energized unless these lamps have burnt out.

The first time delay normally open contact 66 is the first contact to close when the first time delay motor 52 "times out." The second control relay coil 72 when energized closes both of the second control relay contacts 70 and 74. The second time delay normally closed contact 68 is the first contact to open when the second time delay timer motor 86 "times out." Contact 84 is the second delay contact of the second time relay 60, and contact 66 is the second delay contact of the first time delay normally closed contact 50. Contact 60 is the first time delay contact and contact 84 the second time delay contact of the second time delay motor 86.

After the first time delay element 50 is reset, the second control relay contact 70 holds the second control relay coil 72 energized, closing the second control relay contact 74. The first control relay contact 76 opens when the first control relay coil 58 is de-energized, i.e., when the first time delay normally closed contact 50 opens.

As in the case of the first time delay unit A, the second time delay unit B similarly comprises a normally closed time delay contact 84, a timer motor 86 and its clutch 82.

The third control relay contact 77, normally open, holds the second time delay unit B and the third control relay coil 94 energized after the second control relay coil 72 is de-energized and the second control relay contact 74 opens. The second time delay normally closed contact 84 opens after the second time delay contacts 60 and 68 shift from normally open and closed to closed and open respectively.

Thus, when the "test" push button switch 64 is closed, the pilot lamps LT–2, LT–3 and LT–4 are energized through the signal passed through terminals 1 of the switching units 10A, 10B and 10C. The pilot lamp LT-1 is always "on" when voltage is present in the "hot" line 42. When the "signal" push button switch 46 is closed, the signalling of the pilot lights LT–2, LT–3 and LT–4 proceeds as above described.

Figure 4:
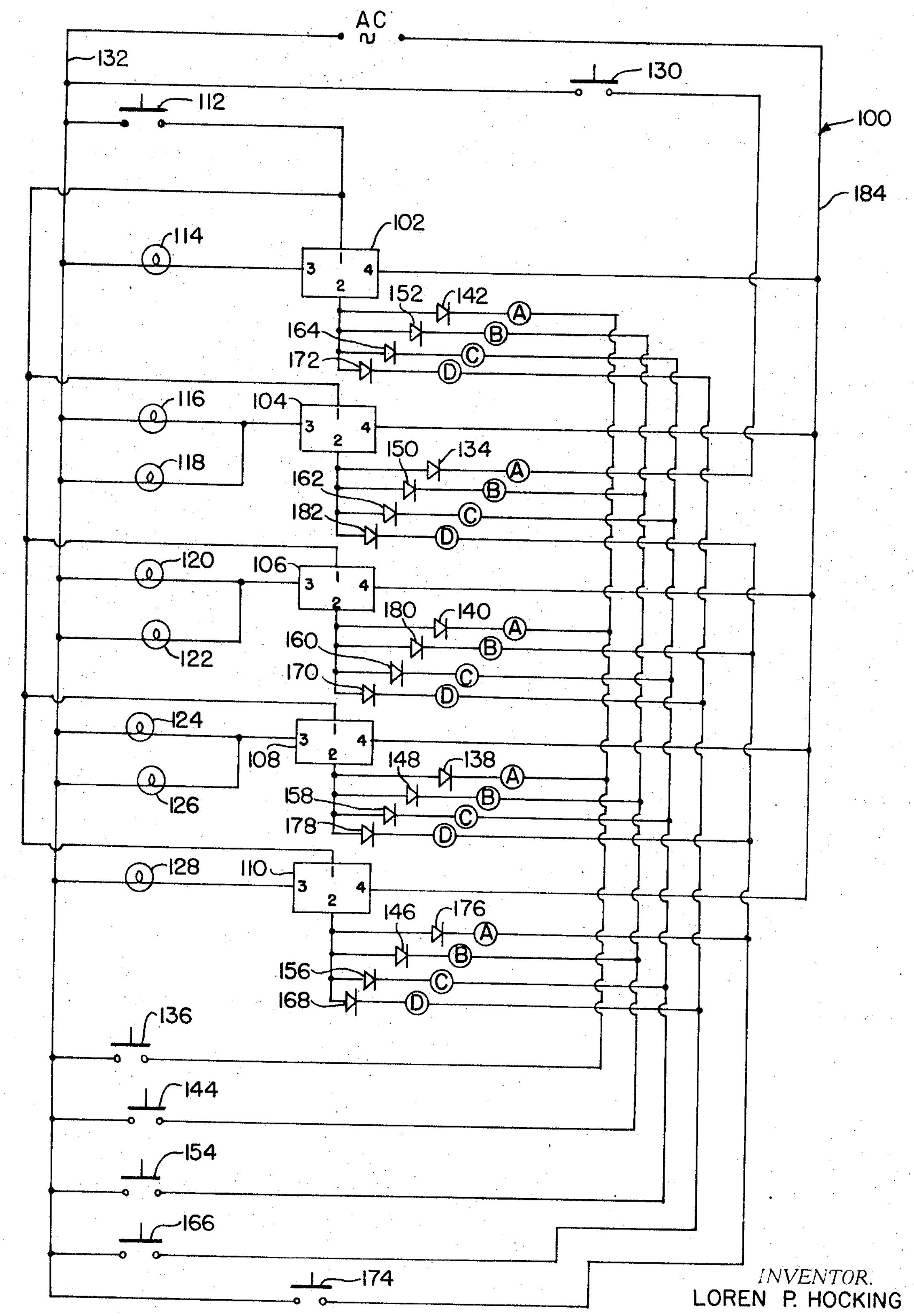
FIG. 4 is a wiring diagram of a representative display lamp system for a sign, embodying the switching circuitry of this invention.

As illustrated particularly in FIG. 4, a wiring diagram for a plurality of display lamps, as for instance in a sign, embodies the switching circuitry 10 illustrated in FIG. 1 and described above. The switching circuitry 10 is embodied in the switching units 102, 104, 106, 108 and 110 inclusive of the display lamp circuit 100. A "test" push button switch 112 is connected in parallel to all of the terminals 1 of the switching units 102, 104, 106, 108 and 110 to close the circuits through their "test" diodes 12 for simultaneously testing the functionality of the lamps 114 through 128 inclusive.

A "signal" switch 130 is connected to the "hot" line 132 of the alternating current circuit 100, as are each of the lamps 114 – 128 inclusive. The other side of the switch 130 is connected to the signal terminal 2 of the switching unit 104 through the A-diode rectifier 134, for lamps 116 and 118. The "signal" switch 136 is connected in parallel to the A-diode rectifiers 138, 140 and 142, connected to the switching units 108, 106 and 102 respectively, for the lamps 124 and 126, 120 and 122, and 114 respectively. The "signa" switch 144 is connected to the B-diode rectifiers 146, 148, 150 and 152, connected to the switching units 110, 108, 104 and 102 respectively, for the lamps 128, 124 and 126, 116 and 118, and 114 respectively. The "signal" switch 154 is connected to the C-diode rectifiers 156, 158, 160, 162 and 164, connected to the switching units 110, 108, 106, 104 and 102 respectively, for the lamps 128, 124 and 126, 120 and 122, 116 and 118, and 114 respectively. The "signal" switch 166 is connected to the D-diode rectifiers 168, 170 and 172, connected to the switching units 110, 106 and 102 respectively, for the lamps 128, 120 and 122, and 114 respectively. The "signal" switch 174 is connected to the A-diode rectifier 176 connected to the switching unit 110 for lamp 128, the D-diode rectifier 178 connected to the switching unit 108 for the lamps 124 and 126, the B-diode rectifier 180 connected to the switching unit 106 for the lamps 120 and 122, and the D-diode rectifier 182 connected to the switching unit 104 for the lamps 116 and 118.

It will be observed that the signalling switches 130, 136, 144, 154, 166 and 174 are connected through diode rectifiers to the signal terminals 2 of each of the switching units 102, 104, 106, 108 and 110.

The terminals 4 of each of the switching units are connected directly to the "common" line 184 of the alternating current source. The switching units are all arranged in parallel, as are the display lamps and the "signal" switches connected to their terminals 2.

The functions of the switching units 102, 104, 106, 108 and 110 are those described above for the switching circuitry 10. Thus, when the "test" switch 112 is closed through the terminals 1 of the switching units, all the display lamps 114 through 128 inclusive will be energized simultaneously because current is passed from the conductor 132 through the display lamps connected to the terminals 3, the triac units 22, and the terminals 4 to the conductor 184, closing the circuits through these lamps. The function of the test is to determine the functionality of the lamps, and where a lamp fails to light, it can be visually observed, easily marked for replacement, and replaced.

Note should be taken that a plurality of lamps can be arranged in parallel and connected to the switching units, as for example the lamps 116 and 118, 120 and 122, and 124 and 126, each pair being arranged in parallel and connected to the terminals 3 of the switching units 104, 106 and 108 respectively. A single lamp 114 is connected to the switching unit 102, and a single lamp 128 is connected to the switching unit 110.

The signalling, or controlled energization of the display lamps, is performed by any type of electrical switching device connected to the terminals 2 of the switching units. These devices may be any one of the automatic cycling type, the intermittent time controlled type, or the manual push-button type as illustrated in FIG. 4. Each of these devices, of which the "signal" switches 130, 136, 144, 154, 166 and 174 are merely representative, are connected through diode rectifiers (to eliminate feed-back in the circuitry) to the terminals 2 of the switching units. When these "signal" switches are closed, current passes through the terminals 2 to the "signal" diode 14 and the triac 22 of each of the switching units 102, 104, 106, 108 and 110 to energize the display lamps connected to the terminals 3 of these switching units. The "signal" switches are selectively connected to the terminals 2, whereby any pre-arranged order of signalling the display lamps connected to the switching units can be effected.

It will be understood and recognized by persons skilled in the art from the foregoing descriptions that individual switching units can be connected to a single or a plurality of signalling elements such as pilot lights, display lamps, or other similar devices, for simultaneous testing of all lamps upon closing of a single "test" switch, and for individual signalling of those lamps, either singly or in groups, as may be required in particular circuits to which the inventive circuitry and system here disclosed is applied.

Although particular embodiments of the invention have been disclosed herein for purposes of explanation, further modifications or variations thereof, after study of this specification, will or may become apparent to those skilled in the art to which the invention pertains. Reference should be had to the appended claims in determining the scope of the invention.

I claim:

1. Test and signal circuitry for a load operating on alternating current, comprising a plurality of unidirectional current rectifying means connected in parallel and to a series of resistor elements connected to the input side of the gate circuit of a triac unit, and capacitor means having one side thereof connected to a junction of said resistor elements to maintain said triac unit conducting when voltage appears across one of said rectifying means, and the other side thereof connected to the common line side of said triac unit, said load adapted to be connected to the load circuit of said triac unit on its hot line side.

2. The circuitry defined in claim 1, wherein said load comprises one or a plurality of pilot or display lamps.

3. The circuitry defined in claim 1, wherein said plurality of rectifying means comprises a plurality of diode rectifiers.

4. The circuitry defined in claim 1, wherein said resistor elements comprise a pair of resistors connected in series.

5. The circuitry defined in claim 1, wherein one of said rectifying means is connected to a first or "test" terminal for said triac gate circuit, the second of said rectifying means is connected to a second or "signal" terminal for said triac gate circuit, and said triac unit load circuit is connected to a terminal for said load on its hot line side and to a terminal on the common line side of said alternating current to complete said gate and load circuits.

6. Test and signal circuitry for a load operating on alternating current, comprising a pair of diode rectifiers connected in parallel and to a series of resistor elements connected to the input side of the gate circuit of a triac unit, and capacitor means having one side thereof connected to a junction of said resistor elements for holding a charge received from either of said diode rectifiers to maintain said triac unit gate circuit conducting, and the other side thereof connected to the common line side of said triac unit, said triac unit adapted to be connected on one side to said load served by said alternating current and on its other side to the common line of said alternating current, one of said diode rectifiers adapted to be connected through a first or "test" switch to the hot line of said alternating current, the other of said diode rectifiers adapted to be connected through a second or "signal" switch to the hot line of said alternating current.

7. The circuitry defined in claim 6, wherein said load comprises one or a plurality of pilot or display lamps.

8. The circuitry defined in claim 6, wherein said resistor elements comprise a pair of resistors connected in series.

9. Test and signal circuitry for a pilot or display lamp served by a source of alternating current, comprising a first or "test" diode rectifier connected in parallel to a second or "signal" diode rectifier, a first resistance element connected in series to a second resistance element, a capacitor, and a triac unit forming part of a gate circuit and a load circuit, said diode rectifiers being connected to said first resistance element, one side of said capacitor being connected to the junction of said first and second resistance elements and the other side thereof connected to the common line side of said triac unit, the input side of said triac unit gate circuit being connected to said second resistance element, said diode rectifiers each having a terminal adapted to be connected to the hot line of said alternating current through an external switching device, said triac unit load circuit comprising said triac unit and a first terminal adapted to be connected to said pilot or display lamp, said triac unit and a second terminal adapted to be connected to the common line of said alternating current to complete said load and gate circuits.

10. A switching unit embodying test and signal circuitry for a pilot or display lamp operating on alternating current comprising a pair of diode rectifiers connected in parallel and to a series of resistance elements connected to the input side of the gate circuit of a triac unit, capacitor means having one side thereof connected to the junction of said resistance elements and the other side thereof connected to the common line side of said triac unit for holding a charge recieved from either of said diode rectifiers to maintain said triac unit conducting, said pilot or display lamp adapted to be connected to the load circuit of said triac unit on its hot line side, said diode rectifiers each having a terminal adapted to be connected to the hot line of said alternating current through a switching device, said triac load circuit comprising said triac unit and a terminal adapted to be connected to said pilot or display lamp and a terminal adapted to be connected to the common line of said alternating current to complete said load and gate circuits.

11. The switching unit defined in claim 10, wherein one of said diode rectifier terminals comprises a first or "test" terminal for testing the functionality of said pilot or display lamp by passing a signal current to said triac unit gate circuit, the second of said diode rectifier terminals comprises a second or "signal" terminal for passing a signal current to said triac unit gate circuit to close the same and pass current to said pilot or display lamp.

12. Test and signal circuitry for a plurality of pilot lamps operating on alternating current comprising a plurality of pilot lamps, a source of alternating current operating through a hot line and a common line, a plurality of test and signal switching units each connected to one or more said pilot lamps, each said switching unit comprising a pair of diode rectifiers connected in parallel and to a series of resistor elements connected to the input side of the gate circuit of a triac unit, capacitor means having one side thereof connected to a junction of said resistor elements for holding a charge received from either of said diode rectifiers to maintain said triac unit conducting, and the other side thereof connected to the common line side of said triac unit, said diode rectifiers each having a terminal adapted to be connected to the hot line of said alternating current, said triac unit gate circuit having a first or "test" and a second or "signal" terminal on its hot line side, said triac unit having a load circuit ending on its hot line side in a third terminal connected to a pilot lamp and ending on its common line side in a fourth terminal connected to the common line of said alternating current, first switch means connected to the "test" terminals of said switching units and to said hot line for simultaneously testing the functionality of all said pilot lamps, and second switch means and time delay devices connected to the "signal" terminals of said switching units and to said hot line for selectively closing a circuit for each of said one or more pilot lamps through said triac unit.

13. Test and signal circuitry for a plurality of display lamps operating on alternating current comprising a plurality of display lamps connected in a display pattern, a source of alternating current operating through a hot line and a common line, a plurality of test and signal switching units each connected to one or more display lamps, each said switching unit comprising a pair of diode rectifiers connected in parallel and to a series of resistor elements connected to the input side of the gate circuit of a triac unit, capacitor means having one side thereof connected to a junction of said resistor elements for holding a charge received from either of said diode rectifiers to maintain said triac unit conducting, and the other side thereof connected to the common line side of said triac unit, said diode rectifiers each having a terminal adapted to be connected to the hot line of said alternating current, said triac unit gate circuit having a first or "test" and a second or "signal" terminal on its hot line side, said triac unit having a load circuit ending on its hot line side in a third terminal connected to said one or more display lamps and ending on its common line side in a fourth terminal connected to the common line of said alternating current, first switch means connected to the "test" terminals of said switching units and to said hot line for simultaneously testing the functionality of all said display lamps, and second switch means connected to the "signal" terminal of said switching units and to said hot line for selectively closing a circuit for each of said one or more display lamps through said triac unit.

14. The test and signal circuitry defined in claim 13, wherein said first switch means comprises a manually operable push button switch.

15. The test and signal circuitry defined in claim 13, and including a diode rectifier connected to and between said second switch means and said "signal" terminal to prevent feedback in said circuitry when said second switch means is closed.

16. The test and signal circuitry defined in claim 15, wherein said second switch means comprises a manually operable push button switch.

17. The test and signal circuitry defined in claim 15, wherein said second switch means comprises a plurality of manually operable push button switches each connected to a switching unit through said diode rectifier.

18. The test and signal circuitry defined in claim 15, wherein said second switch means comprises an automatic switching device for energizing said display lamps according to a predetermined display pattern.

* * * * *